DENLEY & HEBERLING.
Coffee Pot.
No. 21,066.
Patented Aug. 3, 1858.
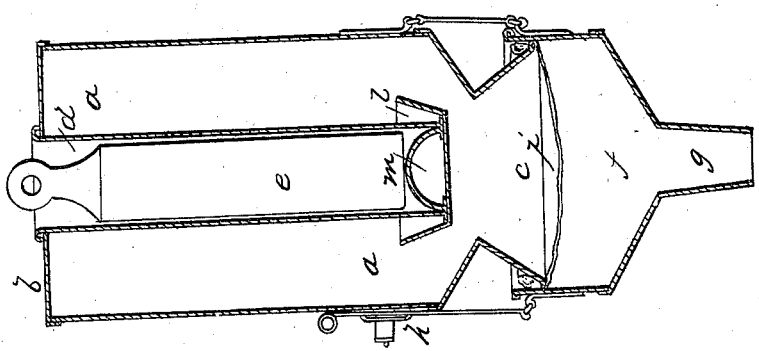
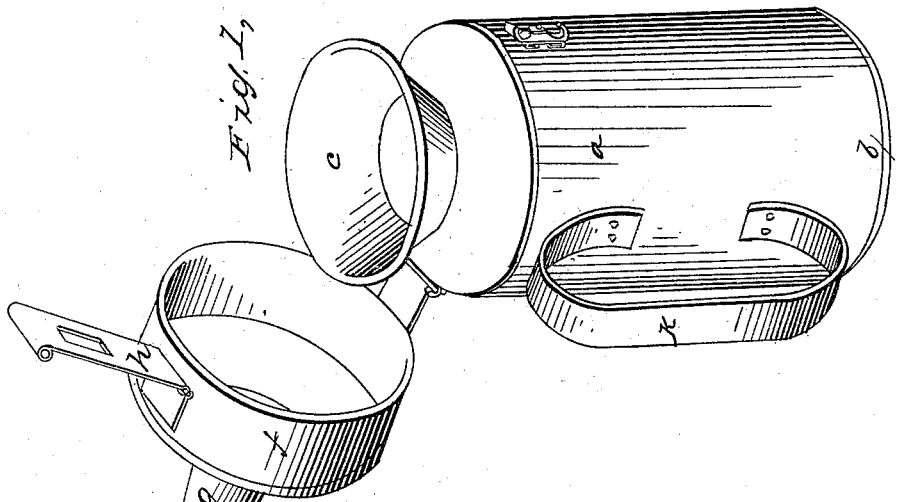
WITNESSES:
Edward C. Lane
John G. Fonda
INVENTORS:
John Denley
Thomas H. Heberling

UNITED STATES PATENT OFFICE.

J. DENLEY AND T. H. HEBERLING, OF WARSAW, ILLINOIS.

APPARATUS FOR MAKING COFFEE.

Specification of Letters Patent No. 21,066, dated August 3, 1858.

*To all whom it may concern:*

Be it known that we, JOHN DENLEY and THOMAS H. HEBERLING, of Warsaw, in the county of Hancock and State of Illinois, have invented certain new and useful Improvements in the Process and Apparatus for Making Coffee; and we do hereby declare that the following is a full and exact description thereof, reference being had to the accompanying drawings, of which—

Figure 1, is a perspective view and Fig. 2 is a longitudinal section of the apparatus.

It is generally conceded that coffee prepared by passing boiling water through a mass of the ground material, is far superior to that made by the ordinary process of boiling; the former mode extracting all the desirable qualities from the berry and retaining the aroma—while the latter injures the flavor of the beverage by long boiling, and the aroma is more or less driven off and lost, and the liquor is left in a thick or turbid state which necessitates a further process of fining or cleaning to render it drinkable. But notwithstanding the objections to the boiling process, it continues to be much more generally employed, owing probably to the more complicated and expensive apparatus needed, and the greater care and time required for making coffee by the better method.

Our improvements are designed to provide a simple and effectual means of preparing coffee in the best manner, by which all the valuable extractive qualities are at once obtained, the escape of the aroma prevented, and the utensil itself being simple and durable in its construction, can be made from common tin plate, and is therefore inexpensive.

In the accompanying drawings (*a*) represents a cylindrical tin vessel, closed at one end (*b*) and having the other end contracted to a neck with a flaring conical mouth (*c*). From the center of the closed end (*b*) a tube (*d*) projects inward, reaching nearly to the most contracted part of the neck of the vessel, where its end is also closed. This tube is for the reception of the iron heater (*e*). A cover (*f*) having a conical top with a spout (*g*) projecting from it, is attached to the cylinder (*a*) by a hinge joint on one side, and when shut on the mouth of the vessel is fastened down by the hasp and button (*h*). The cover serves to hold the strainer (*i*) firmly on to the mouth of the vessel (*a*). This strainer is made of common cotton cloth, bound around with a hem, into which a ring of cotton wicking has been inserted, which makes a water tight joint between the vessel and its cover.

The process of making coffee with our improved apparatus is as follows: A quantity of the ground coffee proportioned to the number of persons to be supplied, is thrown into the vessel (*a*) which is then filled up with boiling water. The strainer (*i*) is then placed over the mouth (*c*) and the cover (*f*) shut down and fastened by its hasp and button (*h*). The vessel, being held by the handle (*k*) is then inverted, with its spout (*g*) over a coffee pot, or other receptacle from which the coffee is to be used at table. The iron heater (*e*) which has in the meantime been brought to a red heat in the fire used to boil the water, is lifted by a wire hook, and dropped into the central tube (*d*). The water in contact with the heated tube immediately recommences boiling, and the steam thus produced collects in the upper part of the vessel, and having there no outlet, it presses on the water below, which in consequence is driven forcibly through the bed of coffee which had settled on the strainer when the vessel was inverted, extracting during its passage all the soluble matter from the grounds, and discharging itself, through the spout (*g*) into the vessel below as a concentrated solution, or extract, at once clear and strong, with its flavor unimpaired and requiring no further settling or fining for use.

In order to furnish the above described utensil at a low price, it is constructed of common tin plate with solder joints; but it is obvious that without some especial provision for its prevention, the joints around the bottom of the heater tube (*d*) would become unsoldered as soon as the water had been driven out of the vessel (*a*). To obviate this a cup (*l*) is soldered on to the end of the tube (*d*) which, when the vessel is inverted, and the heater inserted in the tube, retains a small quantity of the water in the annular space around the foot of the tube, which must all be boiled away before the solder can be melted, by which time the heater is sufficiently cooled down to be harmless in this respect; but as a further precaution a small arch of tin (*m*) is soldered within the tube which prevents the heater from touching the solder joint at its end. The connection of the tube to the end of the cylinder at (b) is by a "double seamed joint" to prevent its becoming loose or leaky, if the solder should accidentally become melted while putting in the heater.

We do not claim the process of scalding coffee and boiling it afterward by additional heat, or forcing water through ground coffee resting on a strainer, neither do we claim the application of a heater to a vessel containing coffee, but What we do claim and desire to secure by Letters Patent is—

1. The apparatus substantially as described for the forcible expulsion of the water through the bed of coffee resting on the strainer (i) in the mouth of the inverted vessel (a), by the pressure of steam in the upper part thereof, produced when the red hot heater (e) is inserted in the central tube (d).

2. We claim the cup (l) for retaining a part of the water around the foot of the heater tube (d), and the tin arch (m) for the purpose of preventing the joint at the end of the heater tube from becoming unsoldered when the rest of the water is driven from the interior of the vessel, as described.

JOHN DENLEY.
THOMAS H. HEBERLING.

Witnesses:
EDWARD E. LANE,
JOHN G. FONDA.